Figure 1:
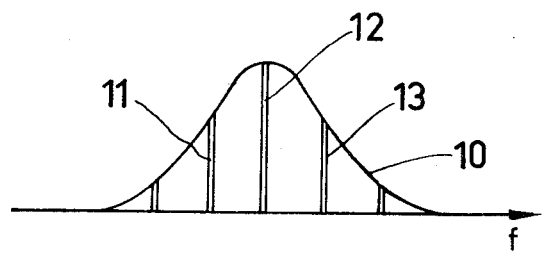

United States Patent

Sandstrom et al.

[15] 3,662,279
[45] May 9, 1972

[54] DEVICE FOR CONTROLLING THE FREQUENCY OF A LASER BEAM

[72] Inventors: Unto Sandstrom, Stureparken 4, 114 26 Stockholm; Nils Abramson, Bergtorpsvagen 62, Taby, 183 64; Ulf Sjolin, Celsiusgatan 7, 112 30 Stockholm; Henrick Murray, Tradgardsgatan 32, itr, 172 38 Sundbyberg; Bertil Colding, Ploggatan 30, 724 66 Vasteras, all of Sweden

[22] Filed: Oct. 20, 1970

[21] Appl. No.: 82,347

[30] Foreign Application Priority Data

Oct. 31, 1969 Sweden..................................14968/69

[52] U.S. Cl.............................................................331/94.5
[51] Int. Cl..............................................................H01s 3/09
[58] Field of Search................................................331/94.5

[56] References Cited

UNITED STATES PATENTS

| 3,277,393 | 10/1966 | Nicolai | 331/94.5 |
| 3,431,514 | 3/1969 | Oehman et al | 331/94.5 |
| 3,517,330 | 6/1970 | Doyle et al | 331/94.5 |
| 3,530,402 | 9/1920 | Doyle et al | 331/94.5 |

*Primary Examiner*—William L. Sikes
*Assistant Examiner*—Edward S. Bauer
*Attorney*—Pierce, Scheffler & Parker

[57] ABSTRACT

A system for stabilizing the frequency of a laser having the resonator reflectors mounted on the ends of a gas discharge tube by controlling the temperature of the tube in response to an optical output signal from the laser.

14 Claims, 4 Drawing Figures

PATENTED MAY 9 1972 3,662,279

SHEET 2 OF 2

DEVICE FOR CONTROLLING THE FREQUENCY OF A LASER BEAM

The present invention relates to a device for controlling the frequency of the radiation emitted from a laser, the laser being of the type, at which each of the laser reflectors is rigidly connected with each its end part of the laser.

One of the objects of the invention is to facilitate production of a relatively cheap controllable laser, for which the coherence length of the radiation emitted from the laser is of a magnitude of several meters or tens of meters. A laser of this type is i.a. useful for measuring distances according to the interferometer method, but the invention is not bound to this special range of application but can be used also within other fields, where laser light with a great coherence length is required.

That the radiation emitted from the laser has a long coherence length means that this radiation consists of essentially only one frequency. A gas laser can, however, oscillate at a number of different frequencies, provided the double length of the laser tube is a whole multiple of the corresponding wave lengths, and that the wave lengths are within the spectral line of the gas, the width of this line being decided by the Doppler effect owing to the thermal velocity of the light emitting gas atoms. In order to achieve a laser under these conditions, which emits only one frequency, the laser can be made so short that only one frequency is embraced within the special line of the gas. One disadvantage at this embodiment is the difficulty to obtain an amplification in this short tube exceeding the losses, and moreover there are difficulties in maintaining the distance between the reflectors so constant that one of the resonance frequencies of the laser is always within the spectral line of the gas. For these reasons the price of such a laser will be high at the same time as the effect of the output radiation will be very low.

By using the present invention these disadvantages are avoided. The condition has been used that at a laser of the type described above, at which each laser reflector is rigidly connected with each one of the end parts of the laser, each longitudinal oscillation mode maintained in the laser has a linear polarization, which deviates from the linear polarization of adjacent longitudinal oscillation modes. If no special measures are taken these linear polarizations for reciprocally oscillation modes are perpendicular to each other, and it is supposed that this is the case also at the laser included in the embodiment of the invention described below.

The explanation of the fact that at a laser of the type described above (without the Brewster window) the different longitudinal modes are linearly polarized; every other in each of two perpendicular planes, may be that some inconsiderable assymmetry of the laser gives preference to a certain polarization direction. The wave length, which is nearest to the middle of the spectral line and is thus the strongest one, can then be assumed to take away all the energy from the atoms contributing in this polarization direction. For adjacent wave lengths only the energy will remain that is present in the remaining atoms, and therefore these will be polarized in a perpendicular direction.

The desired control of the frequency of the radiation emitted from the laser has according to the invention been achieved by the laser having such a restricted distance between the reflectors that substantially only two to five oscillation modes are amplified by the laser. In addition to this a detector and means combined with this, which in dependence of a part of the radiation emitted from the laser control means for adjusting the optical distance between the laser reflectors, are adapted to selectively sense the radiation in one of these oscillation modes and to adjust said optical distance so that the frequency of this oscillation mode is stabilized relative to the maximum point of the spectral line of the gas active in the laser.

According to especially advantageous embodiment of the invention said means comprise means for actuating the temperature of the gas discharge tube of the laser. This actuation may consist of cooling or heating, completely or in part, of this tube.

Figure 3:
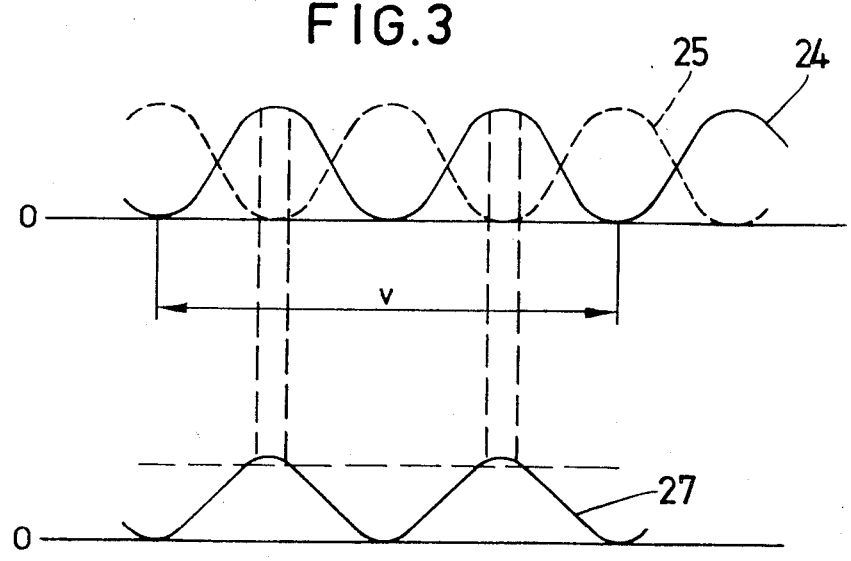
Figure 2:
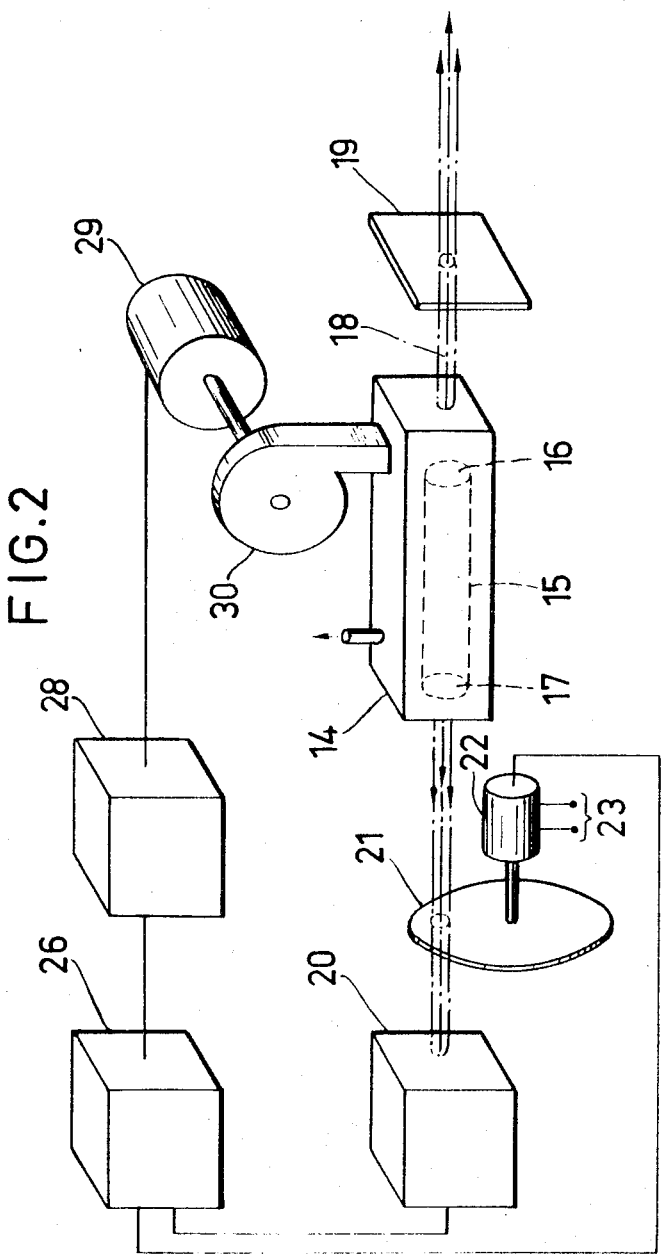
Figure 4:
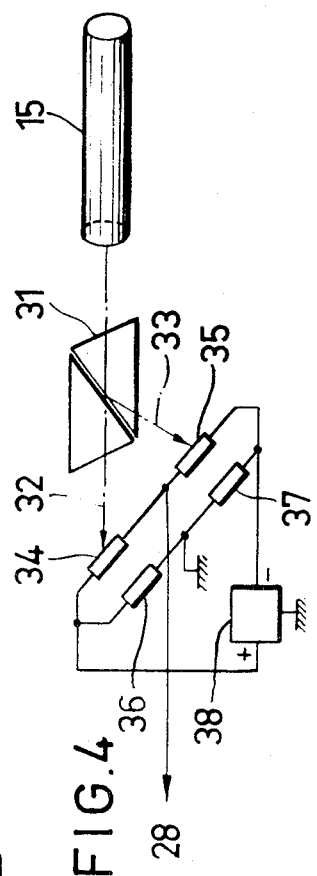

The invention will be described below with reference to the enclosed drawings, wherein FIG. 1 shows the spectral line of the gas relative to the frequencies of a number of different longitudinal oscillation modes, FIG. 2 and 4 show two embodiments of the invention and FIG. 3 shows a number of curves for explaining the function of the embodiments according to FIG. 2 and 4.

In FIG. 1 10 designates the spectral line of the gas active in the laser, thus, the amplitude of the emitted radiation in dependence of the frequency $f$. As is well-known, the spectral line takes this form on account of the Doppler effect, thus the influence of the thermal velocity of the light emitting gas atoms either being in phase or in counterphase relative to the light wave passing for the moment through the laser. A condition for the function of the laser is that standing light waves can be formed in the laser tube, which occurs when a multiple of the wave length of the light is equal to the double distance between the laser reflectors. As a consequence of this condition the distance in frequency between the various standing waves, which can be maintained in the laser tube, will be so small in a long laser of the magnitude 30 cm or more that a relatively great number of longitudinal oscillation modes can be embraced within the spectral line of the laser. If, on the other hand, the laser is made shorter, i.e. of a magnitude of 10 cm, it can be achieved that substantially only the frequency of one oscillation mode is contained within this spectral line. As previously mentioned, in the latter case difficulties may arise in making the laser function, and moreover the effect of the emitted radiation will be relatively low.

At the laser of the invention the length of the laser tube is chosen so that the frequencies of substantially only three to five oscillation modes are contained within the spectral line. According to FIG. 1 three oscillation modes 11, 12 and 13 have such frequencies that they are within the spectral line. As is apparent from the above the longitudinal oscillation mode 12 has a certain linear polarization and the oscillation modes 11 and 13 a polarization that is perpendicular to this.

In order to stabilize the frequency of the oscillation mode 12 so that it will be within the desired part of the spectral line 10 the device of FIG. 2 can be used. This stabilization may aim at holding the oscillation mode 12 symmetrical relative to the spectral line 10 so that the emitted radiation with a frequency corresponding to this oscillation mode has maximum amplitude, but it is also possible, as appears from the following, to stabilize an oscillation mode so that it lies beside the maximum point of the spectral line, and then preferably within a range, where the spectral line has its maximum inclination.

In FIG. 2 14 designates a casing enclosing a laser of a type previously described. This laser, which in the drawing is indicated with dashed lines 15, thus comprises an elongated tube with its ends parallell to each other. The two laser reflectors are combined with these ends and preferably within the discharge tube. The right laser reflector 16 is assumed to have a greater transparency for the radiation produced in the laser than the left reflector 17, and therefore the radiation from the reflector 16 can be sent to a device (not shown in the drawing) for utilizing the laser light, for instance a distance measuring interferometer. In respect of the fact that also at a laser tube of this type the output light is polarized in two directions perpendicular to each other, a polarized filter 19 is inserted in the output laser beam 18, which filter is assumed to be rotatable, so that its polarization direction can be brought to agree with the polarization direction of the longitudinal oscillation mode, whose position relative to the spectral line 10 is stabilized in a manner described below.

The left laser reflector 17 shows a less degree of transparency, and the light beam from this reflector is led to a detector 20 containing a photo cell (not shown in the drawing) with a connected alternating voltage amplifier. Moreover a polarizing filter 21 is inserted between the laser 15 and the detector 20, which is rotated by means of an electric motor 22 receiving current via connectors 23.

By the influence of the rotating polarizing filter 21 the amplitude of the light having a certain linear polarization, which meets the photo cell in the detector 20, and the corresponding output signal from the amplifier will obtain a form as indicated by the curve 24 in FIG. 3, which show the amplitude in dependence of the rotation angle of the polarized filter 21, v representing 360° rotation of the filter. The amplitude will thus reach a maximum value twice per revolution of the filter 21.

At the same time the photo cell in the detector 20 is hit by radiation with a perpendicular polarization direction, and at the output of the amplifier this will cause a signal according to the curve 25. If it is now assumed that the curve 24 represents the radiation of the longitudinal oscillation mode, whose position is to be stabilized relative to the spectral line 10, the signal according to the curve 25 must in some way or other be suppressed. This is achieved by adding the signal from the amplifier in the detector to one of the inputs of a synchronous amplifier 26 with two inputs, to the second input of which a control signal from the motor 22 is led. The object of this control signal is to make the synchronous amplifier conductive only for the periods, when the output voltage from the amplifier in the detector according to the curve 24 has its maximum amplitude. This control signal can in a way known per se be produced if the motor 22 contains a stationary winding preferably fed with D.C. current, which cooperates with a rotatable winding connected to the motor shaft, in which a voltage is produced by induction, whose frequency agrees with the rotation frequency of the filter 21. In this way the voltage 27 shown in FIG. 3 is obtained, whose phase position relative to the voltages 24 and 25 can be varied in a way known per se, for instance by rotating the adjustable stationary winding in the motor 22. The voltage 27 can thus be dephased so that its maximum, as indicated in FIG. 3, coincides with the maximum of the voltage of the curve 24. Thus an output voltage is received from the synchronous amplifier 26, which is sent to a relay means 28. The purpose of this is to control the current supply to an electrical motor 29, which in the embodiment of the invention shown in FIG. 2 drives a ventilator 30, by means of which air is blown into the casing 14 of the laser 15. The device described functions in the following way for stabilizing a certain longitudinal oscillation mode relative to the spectral line of the gas active in the laser. When the laser is connected in its cold state, there is an optical distance between the two reflectors corresponding to certain longitudinal oscillation modes, which according to the above can be embraced within the spectral line of the gas. The number of these oscillation modes can be assumed to be three. During the operation of the laser, however, a heating of the discharge tube will take place, which causes an increase of the optical distance between the reflectors meaning in its turn that the modes 11, 12 and 13 are displaced relative to the spectral line 10. The original oscillation modes will thus gradually fall outside the spectral line and be replaced with other oscillation modes. This displacement takes however place with increasingly lower velocity according as the laser approaches its continuity state. In a certain moment the control circuit comprising the detector 20, the synchronous amplifier 26 and means connected to the amplifier is connected in. This circuit can be assumed to function so that when an output signal is emitted from the synchronous amplifier 26 to the relay means 28, the current to the motor 29 is disconnected so that the ventilator 30 stops. Heating of the laser tube 15 is resumed, which means that the laser tube is extended so that the selected oscillation mode 12 leaves the maximum point of the spectral line 10. Therefore also the amplitude of the voltage according to the curve 24 will be reduced, and when the voltage has reached a determined minimum value the output signal from the synchronous amplifier 26 is interrupted, which causes the motor 29 to start again so that the laser tube 15 is again cooled by air from the ventilator 30. This cooling continues until the oscillation mode 12 has been brought back to the maximum point of the spectral line 10, after which the operation continues so that this oscillation mode is thus stabilized relative to the spectral line 10.

In the foregoing it has been assumed that the air from the ventilator 30 causes cooling of the laser tube 15. It is however in principle also possible to have the adjusting means control additional heating of the laser tube, for instance by a ventilator 30 blowing hot air towards the laser tube. In order that the device should then function the laser tube is brought to reach its continuity state, after which the additional heating is made active and the laser in a manner previously described in principle is locked to an oscillation mode, which will then appear in the laser tube.

It is also possible to add extra heating to the laser tube by providing it with external metallization, to which electric current is supplied by connectors, the size or duration of the current being controlled by the relay means 28 in substantially the same way as the heating air flow. This embodiment has among other things the advantage that the inertia of the system will be small.

At the embodiment shown in FIG. 2 the separation between the two polarization directions has been achieved with electrical means, thus in the synchronous amplifier 26, which is controlled by a signal derived from the motor 22 driving the polarizing filter 21. In FIG. 4 it is shown how this separation can be achieved optically. Thus a Nicol prism 31 is inserted in the light beam coming out through the left laser window, which prism divides the beam from the laser tube 15 into two light beams 32 and 33, which have perpendicular polarization direction relative to each other. Each ot these light beams hits a photo restitor 34 and 35 respectively, which are included in a bridge, the other branches of which contain fixed resistors 36 and 37. The bridge is fed with D.C. voltage from a voltage source 38, a center of tapping of which can be assumed to be earthed. Furthermore, the junction between the fixed resistors 36 and 37 is connected with earth. Finally — as is indicated in FIG. 4 — the junction between the photo resistors 34 and 35 is connected with the relay means 28, and it is realized that when the bridge is balanced, there is no voltage in this conductor between the bridge and the relay means 28 and that voltage is supplied to the relay means 28 with positive or negative polarity when one of the beams 32 and 33 is stronger than the other beam. This change of polarity can thus be used for controlling the current to the motor 29 in substantially the same way as described in connection with FIG. 2.

Also other modifications are possible within the scope of the following claims. Thus it is possible instead of what has been shown in FIG. 2 and 4 to have the detector actuated by the light coming through the laser reflector 16, part of this light from the reflector being deflected by means of a semi-transparent reflector towards the detector 20, while the rest of this light can be supplied to a device for using the light, for instance a range finder, via the polarizing filter 19.

At the embodiments described in connection with FIG. 2 and 4 the air supply to the laser tube 15 has been adjusted by starting and stopping the ventilator 30, but it is obvious that the same effect can be achieved by means of a valve arrangement controlled by the relay means 28, which either interrupts or passes the air flow to the laser tube 15. Furthermore, the relay means 28 might be designed so that it can control the speed of the motor 29 and consequently also continuously change the amount of air supplied to the laser tube 15 from the ventilator 30.

We claims:

1. A laser device for controlling the frequency of the radiation emitted from the laser, each of the oscillation modes maintained in the laser having a polarization direction which is perpendicular to the polarization direction of adjacent oscillation modes, in addition to which part of the radiation emitted from the laser is supplied to a detector, the output signal of which is fed to means for controlling the temperature of the laser tube which controls the adjustment of the optical distance between the laser reflectors which are mounted on the ends of the laser tube, characterized in that the laser has such a limited distance between the reflectors that substantially only two to five oscillation modes are amplified by the laser, and that the detector and sensing means combined with it selectively sense the radiation in one of the polarization directions, in addition to which a signal produced at this selective sensing means is supplied to the temperature controlling means, which adjust the optical distance between the laser reflectors so that the frequency of oscillation modes corresponding to the sensed polarization direction is controlled relative to the maximum point of the spectral line of the laser widened by the Doppler effect.

2. Device according to claim 1, characterized in that the laser used is a gas laser.

3. Device according to claim 2, characterized in that the laser is designed so that each one of the laser reflectors is rigidly connected with each one of the end parts of the gas discharge tube of the laser.

4. Device according to claim 2, characterized in that said temperature controlling means influence the temperature of the tube used in the gas laser by controlling the temperature in at least one part of said tube.

5. Device according to claim 4, characterized in that the laser tube is provided with a metallization, to which an electrical current heating the laser tube is supplied by connectors, the size of said current being controlled by the output signal from the selective sensing means.

6. Device according to claim 4, characterized in that said temperature controlling means produce a temperature controlling air flow, which is directed to the laser tube and the effect of which is controllable.

7. Device according to claim 6, characterized in that the output signal from the selective sensing means is arranged to adjust the time during which the air flow is led towards the laser tube.

8. Device according to claim 1, characterized in that in the beam path between the laser and the detector, means are included, which alternately transmit the two polarization directions for achieving a periodical variation of the radiations reaching the detector.

9. Device according to claim 8, characterized in that said means for alternately transmitting the two polarization directions comprise a rotating polarizing filter.

10. Device according to claim 9, characterized in that the filter is connected to means for producing an electrical voltage representing the instantaneous position of the filter relative to the polarization directions of the radiation from the laser towards the detector.

11. Device according to claim 10, characterized in that this voltage together with the output voltage from the detector is supplied to an amplifier in such manner that only part of the output voltage from the detector and corresponding to one of the polarization directions is amplified and is supplied to the means for adjusting the optical distance between the reflectors.

12. Device according to claim 11, characterized in that the output voltage from the amplifier is supplied to a relay means controlling the current supply to a motor, which drives a ventilator for sending an air flow to the laser tube.

13. Device according to claim 1, characterized in that the detector receives radiation from the laser tube through the least transparent reflector in the laser, a second, adjustable, polarizing filter being located outside the other reflector, whose polarization direction can be brought to agree with the polarization direction of the oscillation mode, which via the detector and means combined with it controls the distance between the reflectors.

14. Device according to claim 1, characterized in that the radiation from the laser is divided into two components having perpendicular polarization directions each one being supplied to one of two photo resistors included in a bridge connection, the output voltage from the bridge being supplied to said means for controlling the optical distance between the laser reflectors.

* * * * *